United States Patent
Tan et al.

(10) Patent No.: US 8,258,524 B2
(45) Date of Patent: Sep. 4, 2012

(54) LIGHT EMITTING DIODE DEVICE

(75) Inventors: Wei-Sin Tan, Oxford (GB); Valerie Berryman-Bousquet, Norton (GB); Tong Zhang, Oxon (GB); Jonathan Heffernan, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 207 days.

(21) Appl. No.: 12/693,475

(22) Filed: Jan. 26, 2010

(65) Prior Publication Data

US 2011/0180824 A1 Jul. 28, 2011

(51) Int. Cl.
- *H01L 33/48* (2010.01)
- *H01L 33/58* (2010.01)
- *H01L 33/60* (2010.01)

(52) U.S. Cl. ....... 257/95; 257/98; 257/99; 257/E33.067; 257/E33.074

(58) Field of Classification Search ............... None
See application file for complete search history.

(56) References Cited

U.S. PATENT DOCUMENTS

| | | | |
|---|---|---|---|
| 6,450,661 B1 | 9/2002 | Okumura | |
| 6,504,301 B1* | 1/2003 | Lowery | 313/512 |
| 6,598,998 B2 | 7/2003 | West et al. | |
| 7,163,327 B2* | 1/2007 | Henson et al. | 362/554 |
| 7,329,029 B2 | 2/2008 | Chaves et al. | |
| 7,942,556 B2* | 5/2011 | Harbers et al. | 362/294 |
| 8,033,674 B1* | 10/2011 | Coleman et al. | 362/19 |
| 2003/0021113 A1 | 1/2003 | Begemann | |
| 2005/0179049 A1* | 8/2005 | Ho | 257/100 |
| 2005/0225988 A1 | 10/2005 | Chaves et al. | |
| 2006/0164005 A1* | 7/2006 | Sun | 313/503 |
| 2007/0120463 A1* | 5/2007 | Hayashi et al. | 313/501 |
| 2007/0268694 A1* | 11/2007 | Bailey et al. | 362/231 |
| 2008/0062703 A1 | 3/2008 | Cao | |
| 2008/0180599 A1* | 7/2008 | Ha et al. | 349/64 |
| 2008/0191236 A1* | 8/2008 | De Graaf et al. | 257/99 |
| 2008/0303052 A1* | 12/2008 | Lee et al. | 257/99 |
| 2009/0001372 A1* | 1/2009 | Arik et al. | 257/58 |
| 2009/0001390 A1* | 1/2009 | Yan et al. | 257/89 |
| 2009/0050911 A1* | 2/2009 | Chakraborty | 257/89 |
| 2009/0103293 A1* | 4/2009 | Harbers et al. | 362/231 |

(Continued)

FOREIGN PATENT DOCUMENTS

JP 2001-111117 A 4/2001

(Continued)

OTHER PUBLICATIONS

DeGroot, J. V. "12." Silicones for Photonics. Midland: Dow Chemical.*

(Continued)

*Primary Examiner* — Victor A Mandala
*Assistant Examiner* — Joseph Schoenholtz
(74) *Attorney, Agent, or Firm* — Renner, Otto, Boisselle & Sklar, LLP

(57) ABSTRACT

A light emitting diode device which includes at least one light emitting diode, a heat-sink chassis having a surface upon which the at least one light emitting diode is mounted, and a waveguide having one end coupled to the at least one light emitting diode for receiving light therefrom. The waveguide has another end which includes a light extraction and redistribution region, and the waveguide is configured to guide light received from the at least one light emitting diode away from the heat-sink chassis and towards the light extraction and redistribution region. The light extraction and redistribution region is configured to extract and redistribute the light from the waveguide.

15 Claims, 15 Drawing Sheets

(Embodiment 1)

U.S. PATENT DOCUMENTS

| | | | | |
|---|---|---|---|---|
| 2009/0273924 | A1* | 11/2009 | Chiang | 362/241 |
| 2009/0322208 | A1* | 12/2009 | Shaikevitch et al. | 313/503 |
| 2010/0002444 | A1 | 1/2010 | Konaka | |
| 2010/0320904 | A1* | 12/2010 | Meir | 315/32 |

FOREIGN PATENT DOCUMENTS

| | | | |
|---|---|---|---|
| JP | 2002-116306 A | | 4/2002 |
| JP | 2002-329404 A | | 11/2002 |
| JP | 2008-077900 A | | 4/2008 |
| JP | 2008-135210 A | | 6/2008 |
| JP | 3148997 U | * | 2/2009 |
| JP | 2010-129300 A | | 6/2010 |
| WO | 2008/157080 | | 12/2008 |

OTHER PUBLICATIONS

Rondeaux, F. "Poster Presentation." Thermal Conductivity Measurements of Epoxy Systems. Proc. of Cryogenic Enigneering Conference, Madison Wisconsin. Madison: CEC, 2001. 1-7.*

Gu,Y., and N. Narendran. "Design and Evaluation of an LED Based Light Fixture." Third International Conference on Solid State Lighting, Proceedings of the SIE 5187 (2004): 318-29.*

Silicon for Photonics by J.V. DeGroot, Dow Corning, Chapter 12 retrieved on Oct. 19, 2011 from the internet <URL http://www.dowcorning.com/content/publishedlit/Chapter12.pdf.*

Sarid, Dror. "High Efficiency Input-output Prism Waveguide Coupler: An Analysis." Applied Optics 18.17 (1979): 2921.*

Gu, Y., and N. Narendran. "Design and Evaluation of an LED Based Light Fixture." Third International Conference on Solid State Lighting, Proceedings of the SIE 5187 (2004): 318-29.*

Silicon for Photonics by J.V. DeGroot, Dow Corning, Chapter 12 retrieved on Oct. 19, 2011 from the internet http://www.dowcorning.com/contentJpublishedlit/Chapter12.pdf.*

International Search Report, related International Application No. PCT/JP2011/052079, mailed Jun. 7, 2011.

* cited by examiner

FIG. 9A (Embodiment 1)
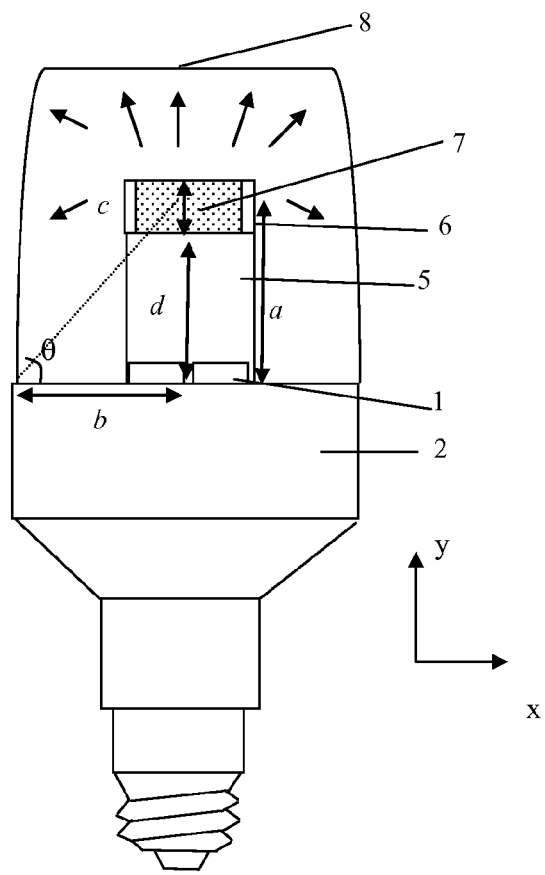
FIG. 9B
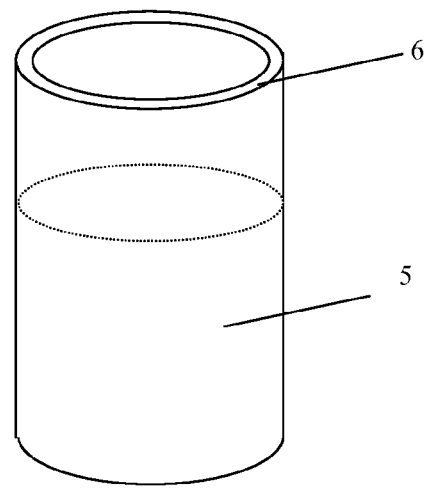

FIG. 10A (Embodiment 2)
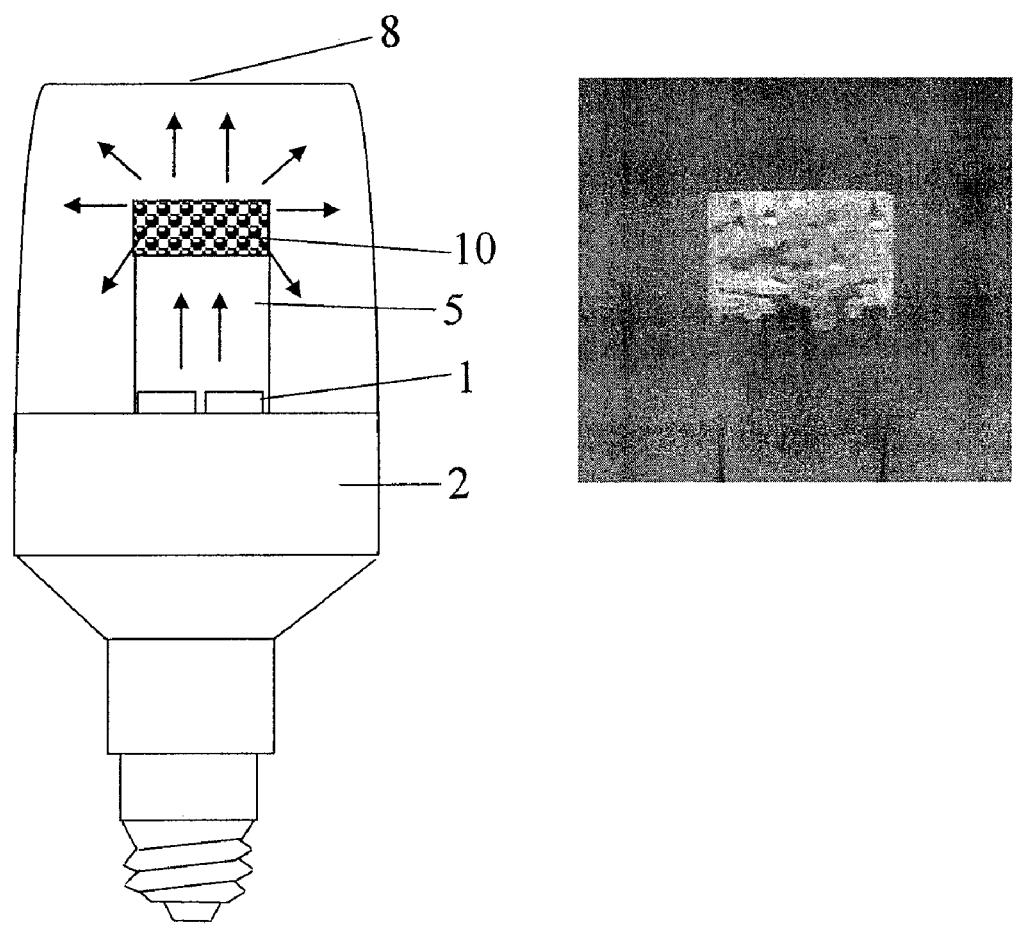

Prism Edge

Incident light   Total internal reflected light

FIG. 11 (Embodiment 3)
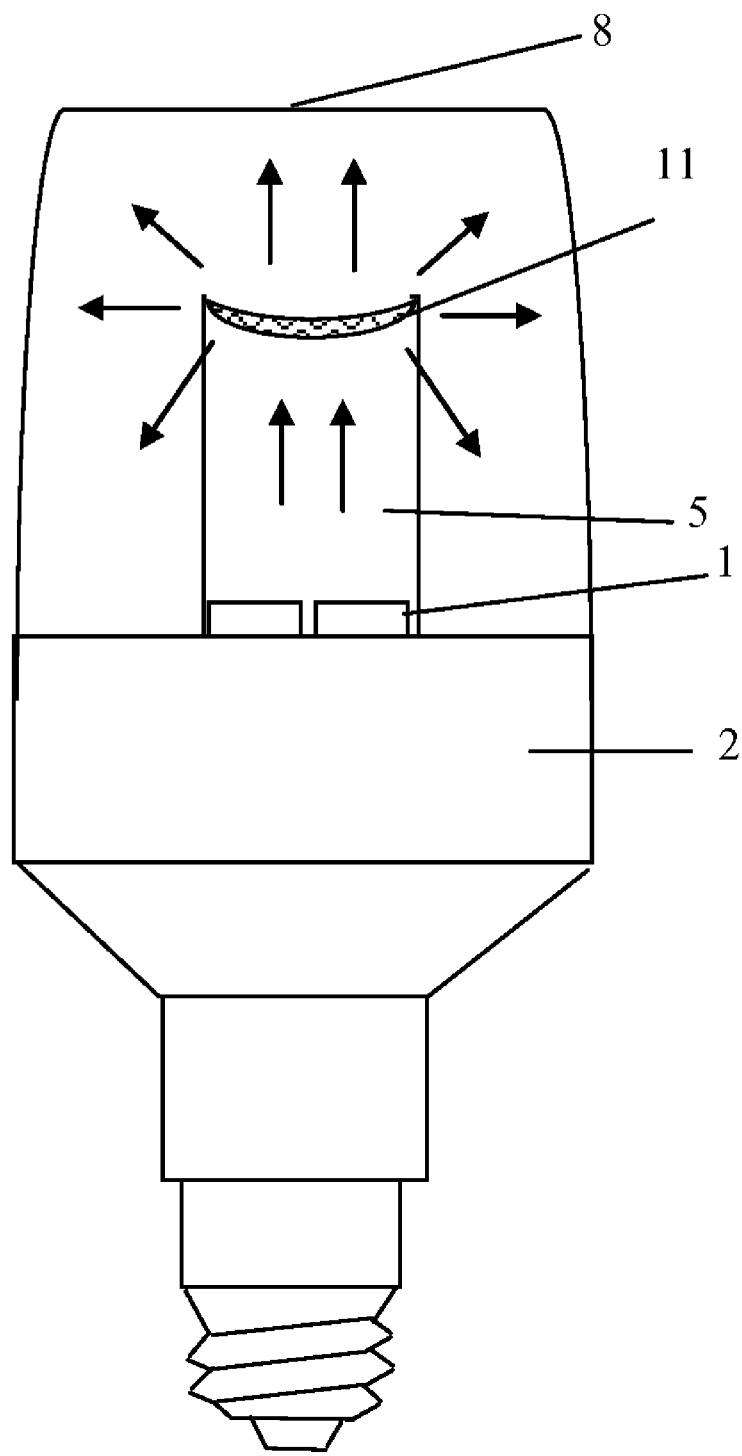

FIG. 12 (Embodiment 4)
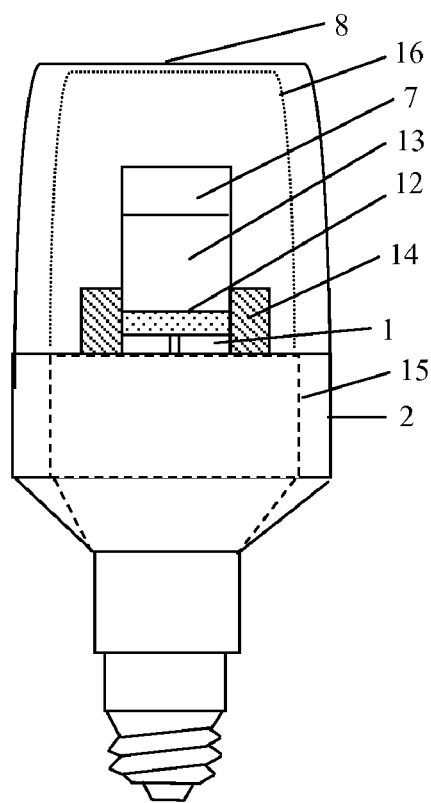
FIG. 13A
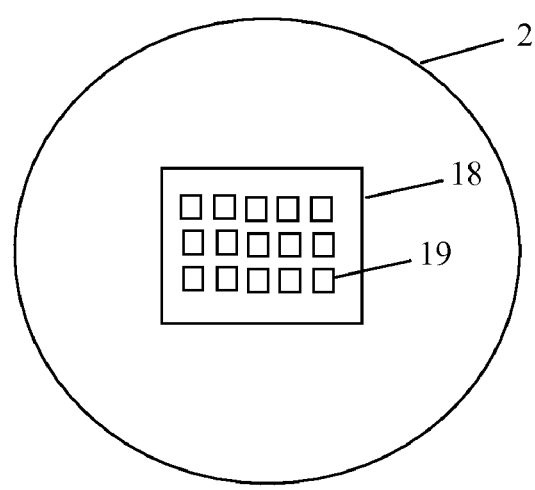

FIG. 13B
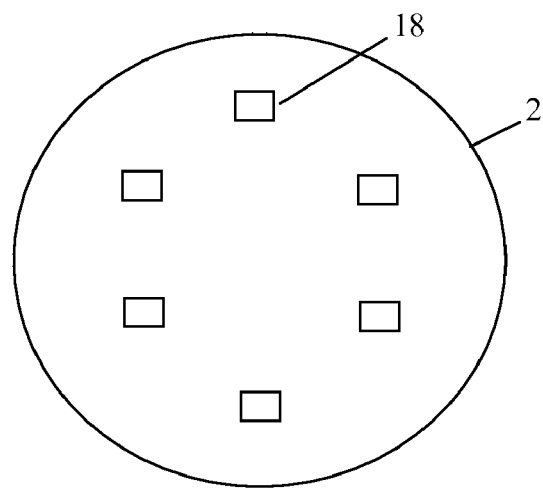
FIG. 14A (Embodiment 5)
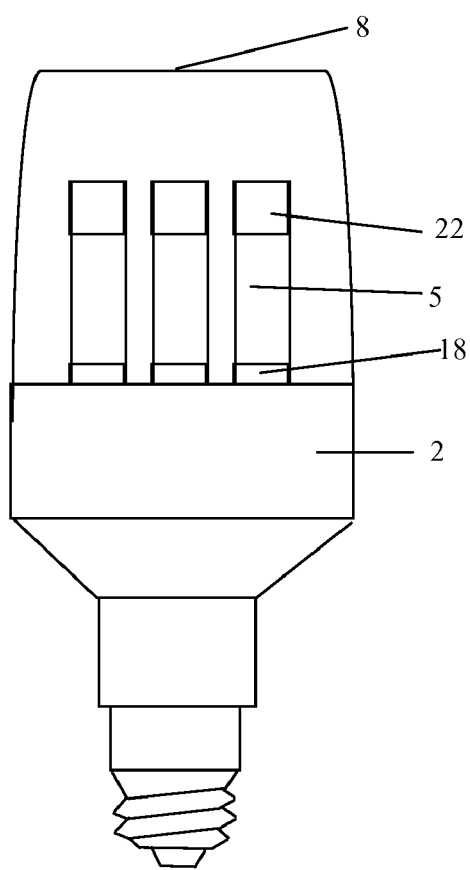

FIG. 14B (Embodiment 5)
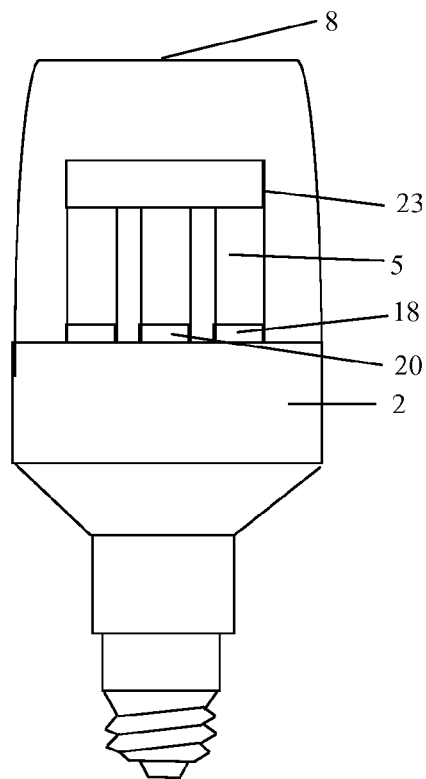
FIG. 15 (Embodiment 6)
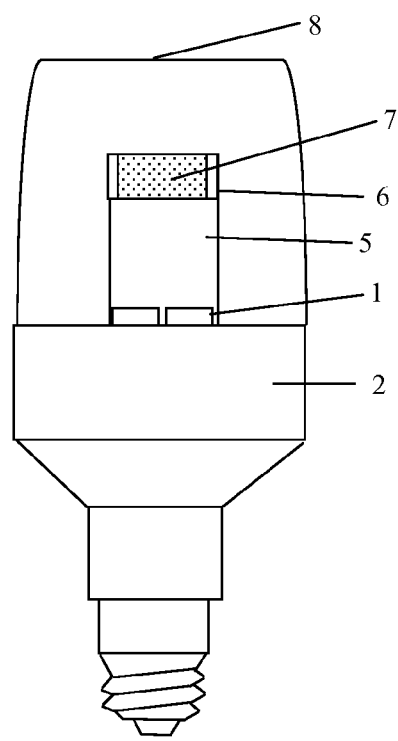

LIGHT EMITTING DIODE DEVICE

TECHNICAL FIELD OF THE INVENTION

The present invention relates to a light emitting diode (LED) device, and in particular an LED device such as an LED bulb having a wide angular light distribution. A method of volume manufacturing such a device with low cost and low absorption loss is also presented.

BACKGROUND OF THE INVENTION

Light emitting diodes are gaining popularity to be used as light sources for various applications. Since the demonstration of high quality Gallium Nitride crystal growth, high efficiency Indium Gallium Nitride quantum well blue LED chips emitting at around 450 nm (blue) wavelength have been intensely developed worldwide. White LED chips obtained from phosphor converted blue LEDs are now used in general lighting and backlighting applications. In particular, LED bulbs are being developed as replacement lamps for incandescent bulbs, halogen bulbs, cold cathode fluorescent lamps (CCFL) and compact fluorescent lamps (CFL) for general lighting applications. However, LEDs are surface mounted devices and light emission has a Lambertian profile with 120° beam angle. Hence the beam angle of the light distribution for LED bulbs commercially available to date is typically 120°-140°. In comparison conventional incandescent or CFL bulbs produce light distribution beam angles larger than 270°. While the LED narrow beam angle property makes LED bulbs ideal for down-lighting applications (mounted on ceiling), it is not ideal for vertical-lighting applications, whereby light is not distributed to the bottom or sides well enough. This results in uneven light distribution and shadowing effect. Conventional methods of using diffusive coating on an LED dome casing to increase scattering and subsequently the beam angle typically results in light loss of 20-30%, resulting in reduced emission efficiency. The angular distribution of the light output for these conventional methods is typically <150° and with different profiles to a conventional CFL bulb.

FIG. 1A shows the Lambertian profile for an LED with a beam angle of 120° on a polar diagram. In FIG. 1B, the angular light distribution of a conventional CFL bulb is shown. Observe that the angular distribution is up to >300° for a CFL bulb, and light intensity distribution is fairly uniform.

FIG. 2A is an example of a commercially available LED bulb using a dome diffuser to improve beam angle and reduce glare. The LED 1 is mounted on a metal heat-sink chassis 2 (typically with fins to increase surface area for redistributing heat) for heat dissipation. In particular for high power LED bulbs, the size of the metal heat-sink chassis 2 is usually increased to dissipate heat more efficiently. Increasing the metal heat-sink area will increase the total LED bulb size and weight, making the light bulb design poorer and less appealing to consumers. The LED bulb casing 3 is usually dome shaped and coated with a diffusive coating 4 to increase beam angle and reduce glare. FIG. 2B shows the polar diagram of an LED bulb with the features described in FIG. 2A. Although the beam angle is increased from FIG. 1A, the uniformity of light intensity distribution is poor, and the angular distribution very different to a CFL bulb. Beam angle is also reduced from this structure, since the large metal heat-sink prevents light from being directed downwards. The diffusive coating 4 is a source of light loss, reducing the LED bulb efficiency.

To overcome some of these issues, LED light bulbs with various configurations have been developed. These are described in the following paragraphs.

FIG. 3 is the schematic diagram of a method to increase LED bulb light distribution isotropy as described in U.S. Pat. No. 6,450,661 B1 (Okumura et al., September 2002). This LED bulb 100 uses a series of LEDs mounted in a disc-like globe distribution to achieve a wide beam angle light distribution, since half the LEDs and therefore their light emission are directed upwards and the other half downwards. In this configuration, heat-sinking of LEDs is not optimal, since the LEDs are not directly mounted onto a heat-sink. The complexity of mounting LEDs in this manner will also increase manufacturing costs. In particular, heat sinking is critical for high power LED bulbs whereby LED efficacy and lifetime are strongly dependent on its junction temperature. Therefore the method described in this citation will be limited to low power LEDs.

FIG. 4 is a schematic diagram of an LED bulb with an increased light beam angle as described in US2008/0062703A1. The LEDs are mounted in a conformal/three-dimensional-like manner, and light is emitted sideways creating a wider beam angle. Good heat-sinking is difficult to achieve in this method, since the LEDs are only in direct contact with a small area of the heat-sink. This method will also be difficult to implement for an LED bulb using a single LED instead of multiple LEDs.

FIG. 5 is a schematic diagram of a method to produce sideways emitting LEDs as described in U.S. Pat. No. 6,598,998 B2 (West et al., November 2002). A reflective mirror or lens 128 is placed above the LED 130 and light is redistributed sideways and escapes through a saw tooth portion. This method can produce a wider beam angle LED device, but will create a dark spot directly above it, which results in shadowing effects that are not desirable.

FIG. 6 is an LED bulb 140 as disclosed in US2003/0021113 A1 (Begemann, January 2003). In this configuration, the LEDs are mounted to a regular polyhedron 142 with at least 4 faces at an elevated height above the LED bulb screw base, to avoid light distributed downwards being shielded by the heat-sink. This method is not suitable for single module LED bulbs and manufacturing costs will also be higher compared to bulbs with LEDs mounted directly on the heat-sink chassis. This is a consequence of the complexity of the mounting geometry of the proposed configuration.

U.S. Pat. No. 7,329,029 B2 (Chaves et al., October 2005) describes the use of a transfer section 150 and an ejector 152 for distributing the radiant emission from the LED 154 as shown in FIG. 7. In this configuration the LED 154 is placed adjacent the transfer section 150 and the ejector 152 is designed in such a way to produce a light angular distribution higher than 120°. Although this invention describes an enhanced light angular distribution, the optical device used is very complex and would be difficult to manufacture cheaply.

Thus there is a need in the art for LED devices with light distribution superior to 120° which maintain good heat sinking in order to provide high efficiency.

An object of the present invention is to provide an LED device with wide beam angle, good heat dissipation properties, and minimal light loss when creating wide beam angle. It is also an object to provide a method for low cost volume manufacturing of such an LED device. This is important since cost is a key issue for LED device to be competitive against conventional incandescent and CFL lamps.

SUMMARY OF THE INVENTION

The present invention provides an LED device with low loss, wide beam angle and good heat-sinking properties. In addition, the invention provides an inexpensive method of volume manufacturing. The LED device includes a waveguide, and a light extraction and redistribution region positioned at an elevated height from the metal heat-sink chassis on top of the waveguide. The LED device preferably uses a clear glass casing in this case.

An aspect of the invention is for the point of light source to be elevated to a position above a surface mounted LED, away from the metal-heat sink chassis. This in turn allows light to be distributed in an isotropic manner, and light directed downwards is not shielded by the heat-sink chassis, essentially creating a wider beam angle.

In one aspect of the invention a small pocket on a top region of the waveguide is created, and glass particles/beads embedded in a resin are placed into the pocket for it to act as a light extraction and redistribution region.

In another aspect of the invention, the light extraction and redistribution region can be made by forming holes onto the top region of the waveguide to create an isotropic light extraction and redistribution region. The holes created on top of the waveguide will redistribute light in all directions, thus creating a wide beam angle device. This method also benefits from easy manufacturability and lower absorption over conventional diffusive coating method.

According to another aspect, the light extraction and redistribution region can also be made using a partial mirror positioned or formed on top of the waveguide. In this case, the partial mirror will reflect and refract some light downwards and sideways, but also allow some light to be distributed upwards.

According to a particular aspect of the invention, the waveguide can be split into two sections. The lower section is made of a high thermal conductivity and optically transparent material such as aluminium nitride (AlN) or any other suitable material to enable heat-sinking from both the top and bottom side of the LED. The additional heat-sinking path created allows the size of the heat-sink chassis to be reduced, reducing the size of the LED device and improving the design.

According to another aspect, the bottom portion of the waveguide is split into two sections. The lower sections contain a transparent liquid. In this case, heat-sinking is achieved on both the top and bottom side of the LED. On the top side, convection of transparent liquid helps improve heat sinking properties.

With still another aspect, the waveguide can be made of materials (i.e. PMMA) that blocks/reduces ultra violet (UV) light exposure to the LED. This protects the encapsulant such as epoxy resin in LED chips from UV light, and reduces 'yellowing' of the resin.

In accordance to another aspect, if multiple module LEDs, each including one or more LEDs, are used in the LED device, the device can be configured using multiple waveguides and multiple light redistribution regions to create a wide beam angle LED device.

In yet another aspect, an LED device includes both cold and warm colour temperature LED modules to produce a variable colour temperature device. The device is then configured with multiple waveguides directed to a single diffuser at the top of the waveguide to create a wide beam angle LED device. Similarly, this concept is also applicable to LED devices with different light emission wavelength LEDs such as red, green and blue, and any other combination of emission wavelength and whereby multiple waveguides are used and light directed to a light redistribution region at the top where it is mixed.

In accordance to another aspect, the LED device is constructed by placing phosphors or nanophosphors remotely on the light redistribution region on top of the waveguide. This construction will thereafter be referred to as remote phosphor.

More particularly, the present invention presents a light emitting diode device which includes at least one light emitting diode, a heat-sink chassis having a surface upon which the at least one light emitting diode is mounted, and a waveguide having one end coupled to the at least one light emitting diode for receiving light therefrom. The waveguide has another end which includes a light extraction and redistribution region, and the waveguide is configured to guide light received from the at least one light emitting diode away from the heat-sink chassis and towards the light extraction and redistribution region. The light extraction and redistribution region is configured to extract and redistribute the light from the waveguide.

According to another particular aspect, the light extraction and redistribution region is configured to redistribute at least some of the light back towards the heat-sink chassis without the light being shielded by the heat-sink chassis.

In yet another particular aspect, the light extraction and redistribution region includes a pocket region on a top section of the waveguide with glass beads located within the pocket.

According to another particular aspect, the glass beads are embedded in resin within the pocket region.

In accordance with still another particular aspect, the light extraction and redistribution region includes holes formed in the waveguide.

According to another particular aspect, the light extraction and redistribution region includes prism-shaped features formed in the waveguide.

According to yet another particular aspect, the light extraction and redistribution region includes a partially transmitting mirror.

In accordance with another particular aspect, the partially transmitting mirror is configured to redistribute the light in different directions by transmitting a portion and reflecting another portion.

In still another particular aspect, the waveguide includes a lower section adjacent the at least one light emitting diode and an upper section adjacent the light extraction and redistribution region, the lower section having a thermal conductivity which is higher than the thermal conductivity of the upper section, and the light emitting diode device further includes a thermally conductive collar configured to dissipate heat, extracted by the lower section from the at least one light emitting diode, to the heat sink chassis.

According to another particular aspect, the lower section includes aluminum nitride.

In still another particular aspect, the lower section includes optically transparent liquid through which the heat from the at least one light emitting diode is extracted by convection.

According to still another particular aspect, the waveguide includes a material which blocks or reduces ultra violet (UV) light exposure to the at least one light emitting diode.

With still another particular aspect, the material includes Poly(methyl methacrylate) (PMMA).

In accordance with another particular aspect, the light emitting diode device includes a plurality of light emitting diodes mounted to the surface of the heat-sink chassis, and a plurality of waveguides each having one end coupled to a respective at least one of the plurality of light emitting diodes for receiving light therefrom, and another end which includes a light extraction and redistribution region. Each of the plurality of waveguides is configured to guide light received from the respective at least one light emitting diode away from the heat-sink chassis and towards the light extraction and redistribution region, and the light extraction and redistribution region is configured to extract and redistribute the light from the waveguide.

According to another particular aspect, the light extraction and redistribution region of each of the plurality of waveguides combine to form a common light extraction and redistribution region.

According to still another particular aspect, the plurality of light emitting diodes have different temperature or color characteristics.

In accordance with another particular aspect, the light extraction and redistribution region(s) include phosphors or nanophosphors.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIGS. 9A and 9B are schematic diagrams of an LED device according to Embodiment 1 of the invention, with FIG. 9A being in partial cross-section.

FIGS. 10A through 10D are schematic diagrams of an LED device construction according to Embodiment 2 of the invention;

FIG. 11 is a schematic diagram of an LED device construction using a partially transmitting mirror, according to Embodiment 3 of the invention;

FIG. 12 is a schematic diagram of an LED device construction using a portion of the waveguide to act as a heat-sink path, according to Embodiment 4 of the invention;

FIGS. 13A and 13B are plan views of a single LED and multiple LED configurations in an LED bulb, respectively, according to the invention;

FIGS. 14A and 14B are schematic diagrams of an LED device construction as using multiple waveguides as described in Embodiment 5 of the invention; and FIG. 15 is the schematic diagram of an LED device construction using remote phosphor as described in Embodiment 6 of the invention.

DETAILED DESCRIPTION OF THE INVENTION

Figure 1A:
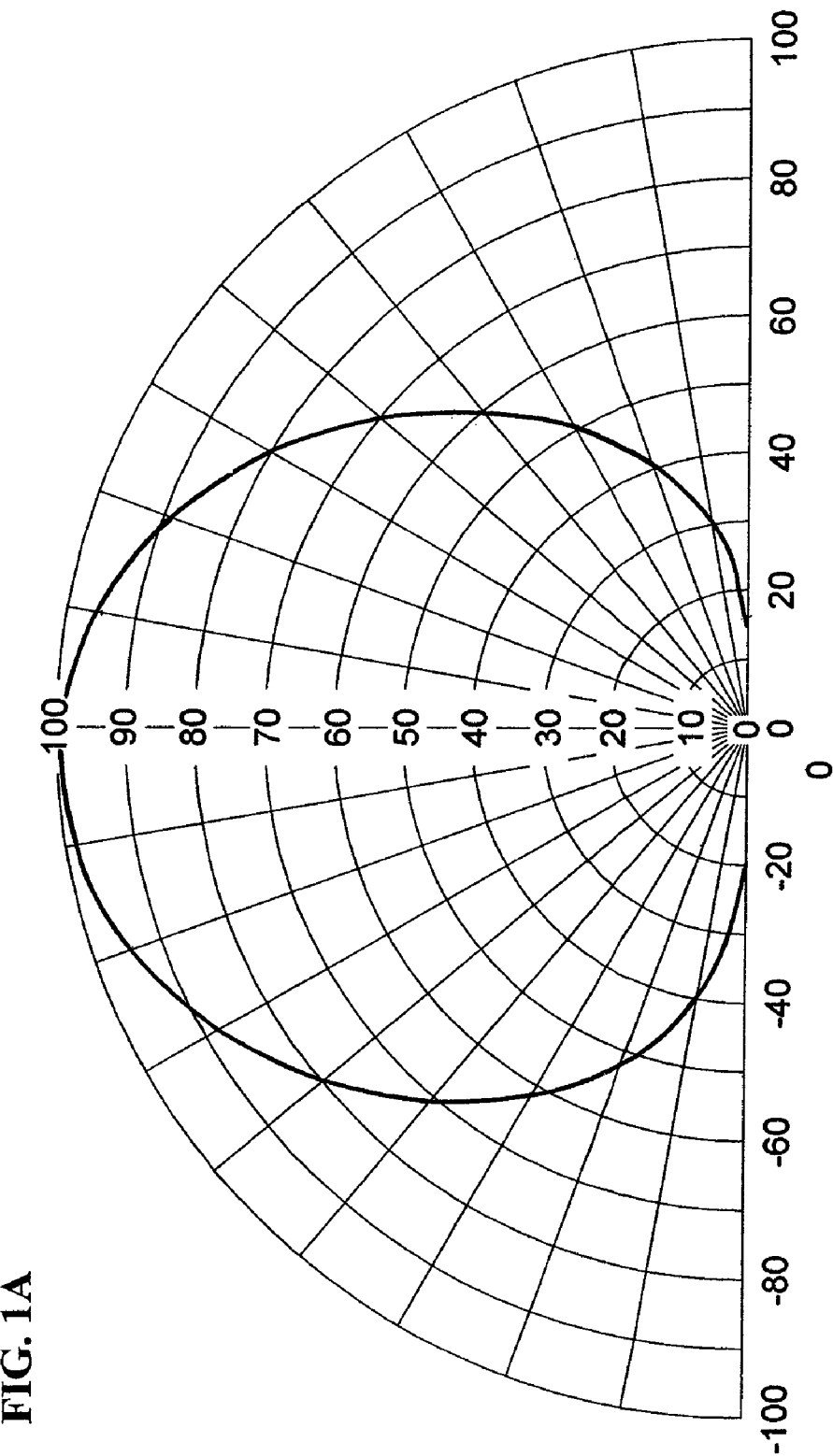
FIGS. 1A and 1B are polar diagrams of known LED and CFL bulb configurations, respectively.

The present invention provides an LED device, such as an LED bulb, with a wide beam angle, good heat-sinking properties and low optical loss, and an inexpensive method of volume manufacturing such an LED device. The invention will be detailed through the description of embodiments, wherein like reference numerals are used to refer to like elements throughout.

Figure 8:
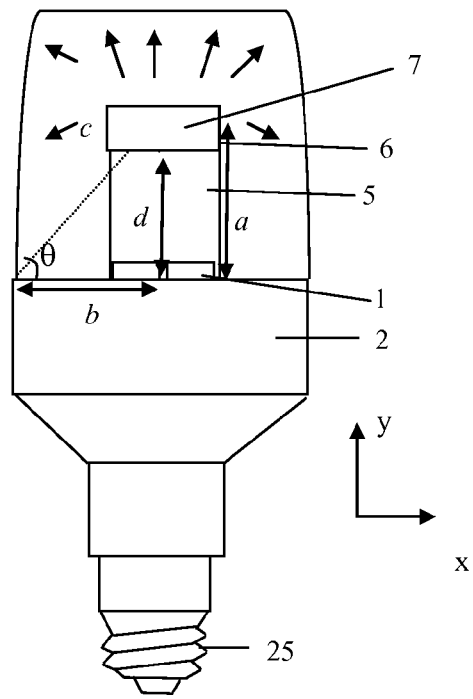
FIG. 8 is a general schematic diagram of an LED device construction in accordance with the invention.

According to the invention, a wide beam angle LED device may be obtained using the conventional metal heat-sink structure. As illustrated in FIG. 8, an LED bulb is provided in which a waveguide 5 elevates the point of light source to a light extraction and redistribution region 7 above the otherwise conventional metal heat-sink chassis 2 where one or more LEDs 1 are mounted. Coupling of the LEDs 1 to the waveguide 5 can be made either by including the LED chip or chips inside the waveguide 5 or attached to the outside of the waveguide 5. In both cases, a refractive index matching material preferably is used between the LED chip and the waveguide 5 as will be appreciated by those having ordinary skill in the art.

The height of the light source elevation is given by equation 1:

$$\tan \theta = a/b \qquad (1)$$

Whereby a is the length of the waveguide 5 to where the mid-point of light source 7 is elevated, b is the distance between the edge of the metal heat-sink chassis 2 where the LED chips are mounted to the waveguide 5, and d the length of the waveguide 5. If the elevated point of light source consists of a light redistribution region 7 with a length of c, a is equal to the sum of a=d+(c/2). θ is the angle of light to be emitted downwards beyond the x-plane define by the plane of the metal heat sink chassis 2.

As an example, whereby uniform light intensity distribution is required for an angle of up to 270°, the light emitted downwards beyond the x-plane is required to be at least 45° on each side. In this case, tan 45°=1, hence the ratio of a/b in equation 1 must be equal to unity. This allows light to be distributed in an isotropic manner, and light directed downwards is not shielded by the heat-sink chassis, essentially creating a wider beam angle.

The LEDs 1 may be directly mounted on the chassis of the metal heat-sink 2 to maintain good heat dissipation, especially for high power LED devices. Known methods for attaching the LEDs 1 to the heat-sink chassis 2 may be used and will therefore not be described in detail herein for sake of brevity.

Figure 2A:
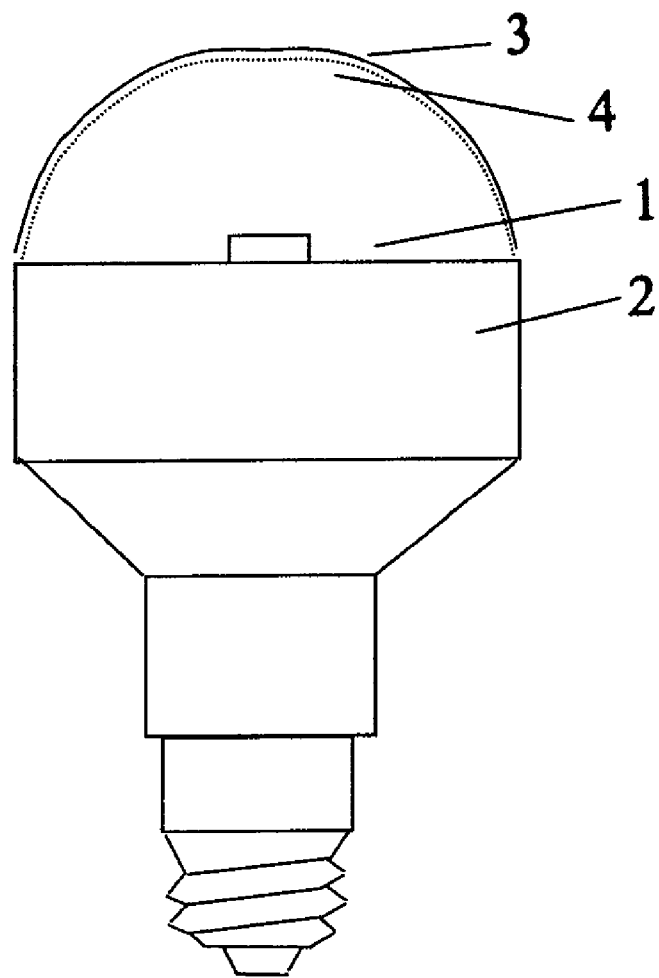
FIGS. 2A and 2B are, respectively, a schematic diagram of a conventional dome style LED bulb and corresponding polar diagram.

Hence, the above-described method allows for a wide beam angle LED device with larger angular distribution without requiring the conventional diffusive coated dome casing as in the known construction of FIG. 2A.

Embodiment 1

A first particular embodiment of an LED device in accordance with the present invention is illustrated in FIG. 9A. The LED device includes one or more LEDs 1, a metal heat-sink chassis 2, a waveguide 5 with a pocket region 6 created at the top of the waveguide 5, and a light extraction and redistribution region 7. The waveguide unit 5 acts to elevate the point of light source from the LED 1 to the light extraction and redistribution region 7, to overcome light emitted downwards from being shielded by the metal heat-sink chassis 2. The waveguide 5 can be made from any known light guide materials with minimal optical absorption, and in this example, clear polished acrylic is used. In the exemplary embodiments described herein, the LED device is an LED bulb including a conventional screw-type mount 25 for mounting the bulb in a conventional screw-type socket of the type included in consumer lamps, etc. It will be appreciated, however, that the LED device may also be any of a variety of other type bulbs used for special or general purpose lighting, and may include any of a variety of known types of mounts for mounting in a corresponding socket or the like. Electrical power is received from the corresponding socket or the like and is provided to the one or more LEDs 1 via the mount 25 of the LED device using conventional techniques via appropriate circuitry as will be appreciated.

A detailed construction of the waveguide 5 and pocket region 6 is illustrated in FIG. 9B. The point of light source is elevated by the waveguide 5 and the top of the waveguide 5 is made hollow on the inside to form the pocket region 6. To create the light extraction and redistribution region 7 in Embodiment 1 and as shown in FIG. 9A, fine glass beads of various sizes from 10-400 micrometers (μm) are embedded in a resin and included within the pocket region 6. In this example used, the parameters a and b are equal to 3 centimeters (cm) respectively to create an LED device with uniform light intensity up to 270°.

Such a construction method as described herein is inexpensive and provides a simple manner in which to create a light redistribution region 7 in an LED bulb with a wide beam angle. The LED device is then completed by providing a clear glass casing 8 for protection.

Figure 1B:
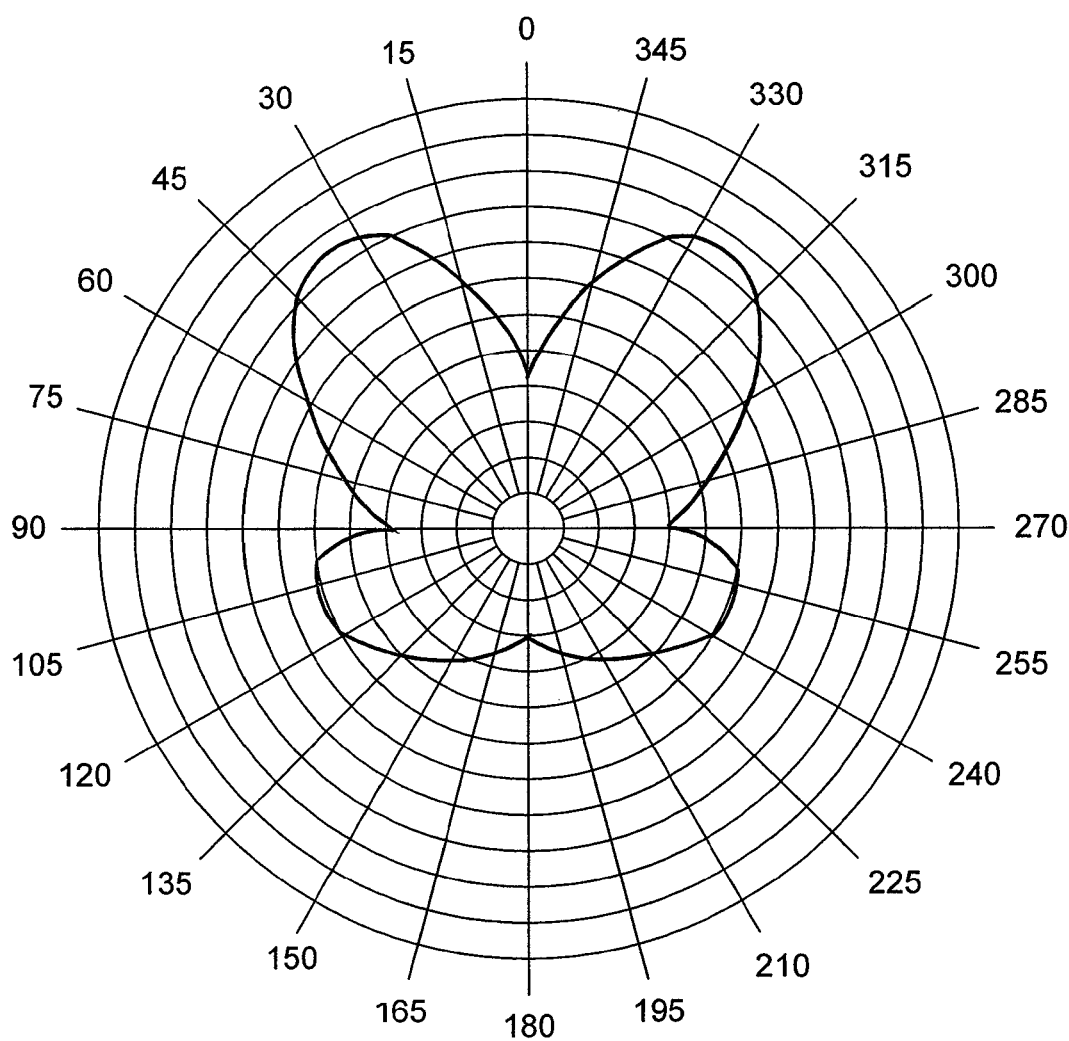
Figure 2B:
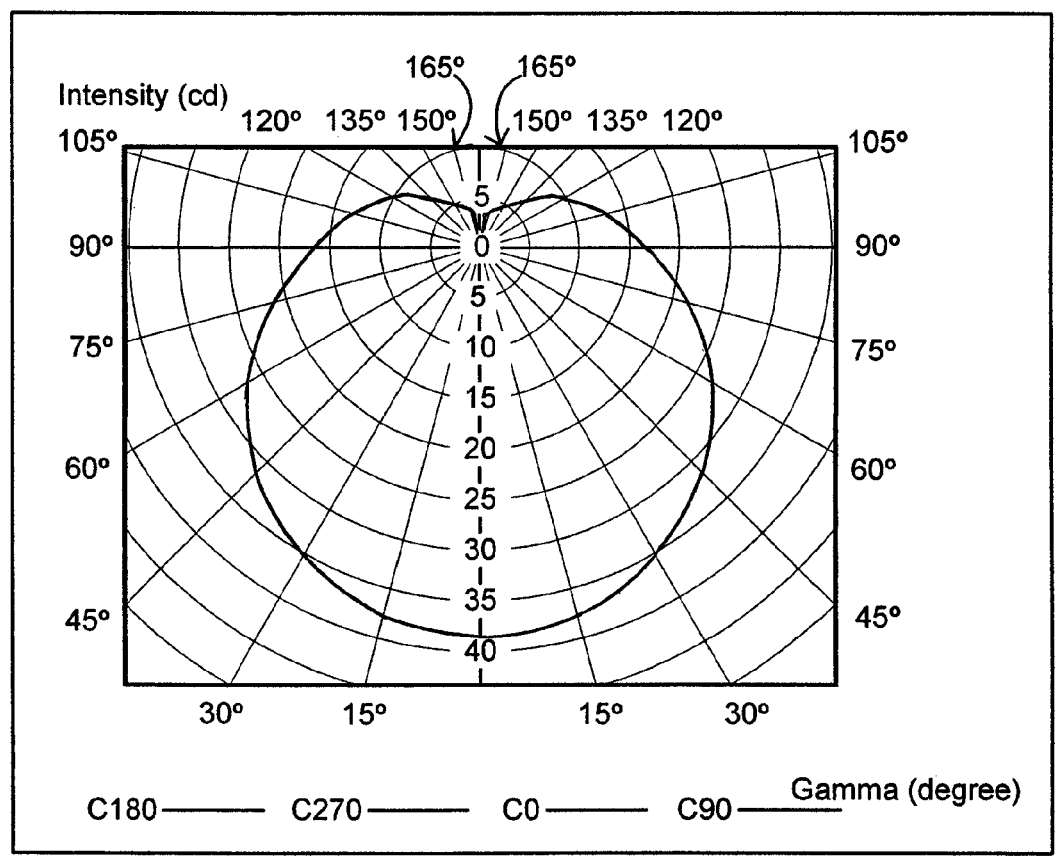
Figure 3:
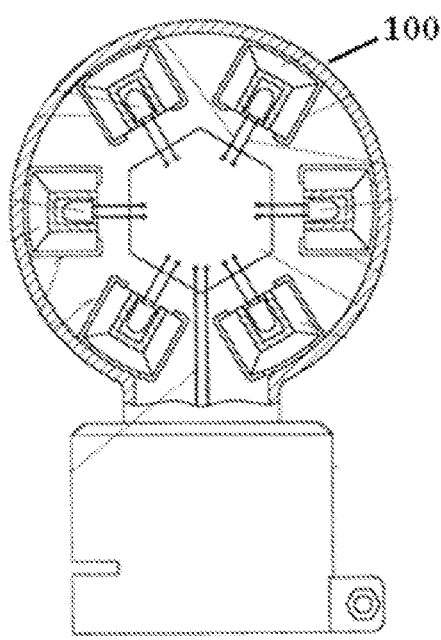
FIG. 3 is a known LED bulb using LEDs configured in a disc-like globe distribution.
Figure 4:
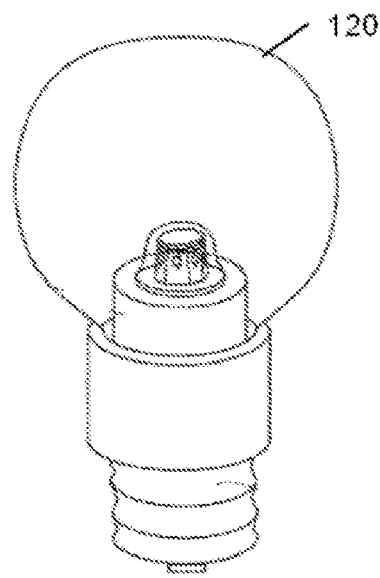
FIG. 4 is a known LED bulb with LEDs mounted in a conformal manner.
Figure 5:
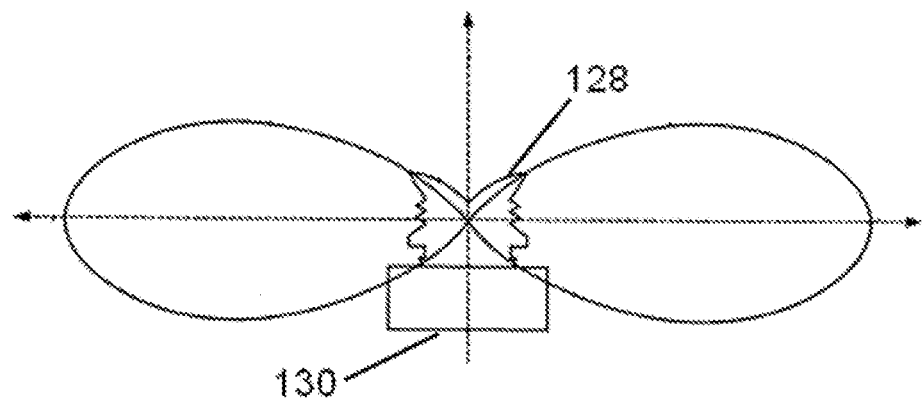
FIG. 5 is another known LED device designed to emit light sideways.
Figure 6:
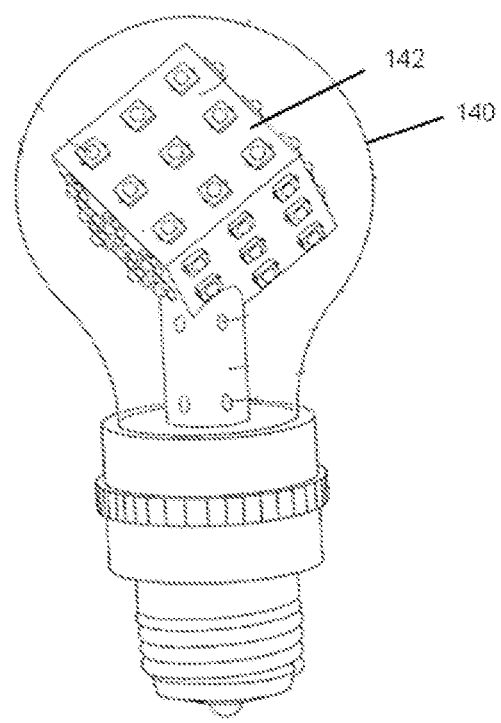
FIG. 6 is a known LED bulb with an elevated light source.
Figure 7:
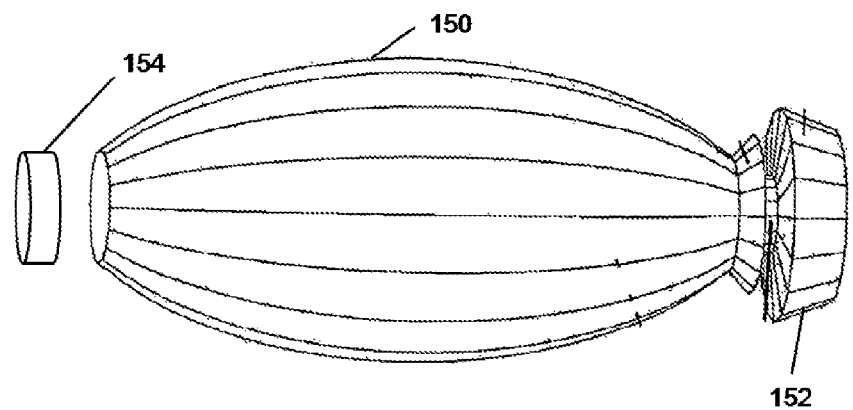
FIG. 7 is another known optical device.
Figure 9C:
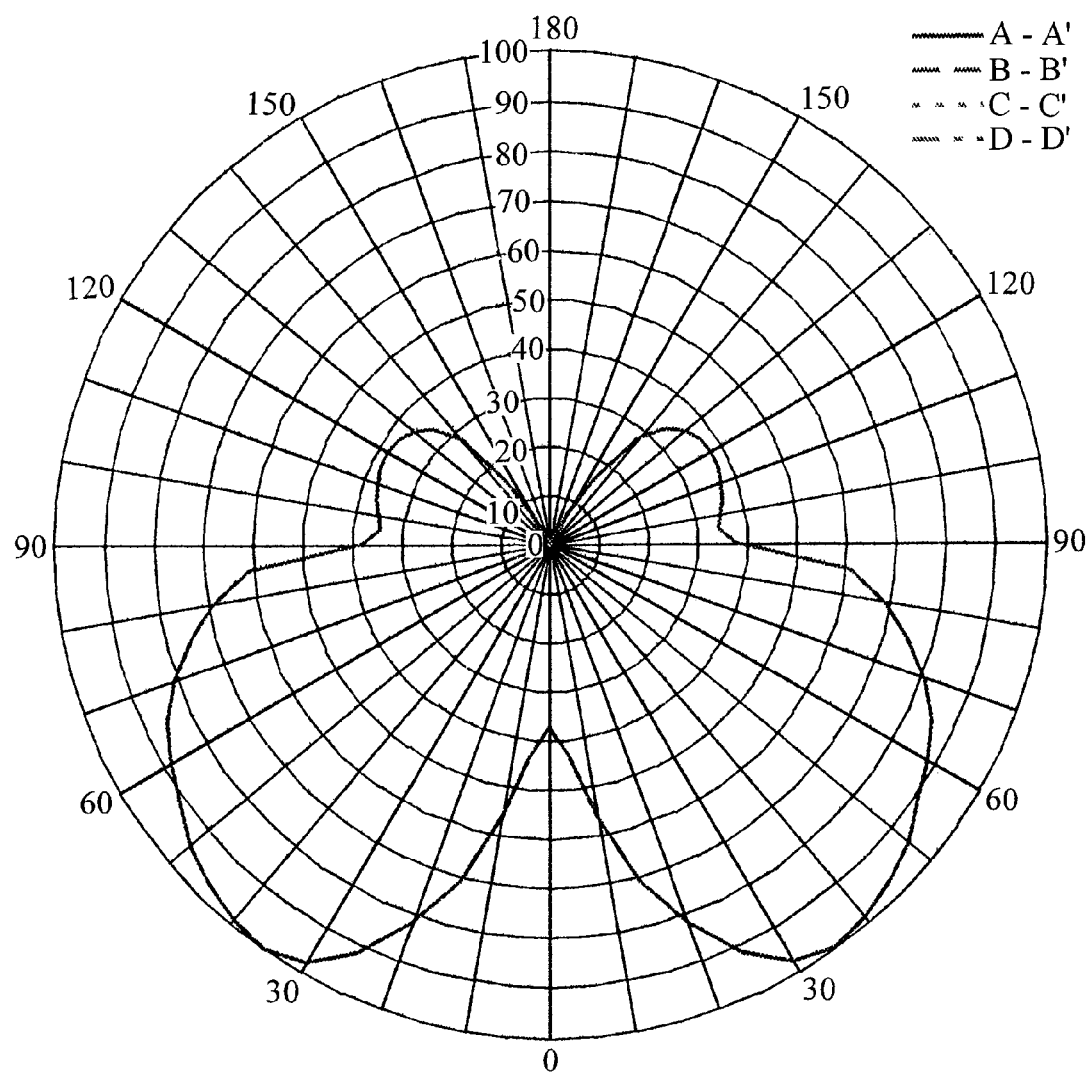
FIG. 9C is the polar diagram of an example of its light intensity distribution.

FIG. 9C shows the polar diagram of the LED device of Embodiment 1. The beam angle is increased from 120° of an LED chip in FIG. 1A to 290° in FIG. 9C. Since the light source in the form of the light extraction and redistribution region 7 is elevated, the polar diagram of FIG. 9C is more similar to the corresponding CFL bulb in FIG. 1B, as compared to the polar diagram of a conventional LED bulb with diffusive dome in FIG. 2B. The efficacy of the LED device in this example is 54.4 (lumen/Watt) lm/W, compared to 60 lm/W for a similar LED device without the waveguide 5 and light extraction and redistribution region 7. This translates to an efficiency of >90%. This corresponds to optical losses lower than 10%. Furthermore, if the LED 1 is a white LED with a colour rendering index (CRI) and colour temperature (CCT) respectively equal to 86° and 2800° Kelvin (° K) the LED device in accordance with the present invention will not affect these properties.

Embodiment 2

According to this embodiment, the general structure in FIG. 8 can be modified to the structure shown in FIG. 10A. For this structure, the acrylic waveguide 5 is similarly used to elevate the point of light source. However, in this embodiment the light extraction and redistribution region is made up of holes 10 formed in the top region of the waveguide 5 (an example is shown in inset of FIG. 10A). The holes 10 will reflect and refract the light in all directions. Indeed the difference in refractive index between the waveguide material and air is large enough to create optical reflection when light hits the interface between the waveguide 5 and air. The manner that the holes 10 are positioned in the waveguide 5 can be tailored to realise different types of angular light distribution patterns as will be appreciated by those having ordinary skill in the art. This method is beneficial because the entire waveguide 5 and light redistribution region made up by the holes 10 is easy to manufacture, in particular using plastic injection moulding methods. The holes method will also benefit from less optical losses over the method described in Embodiment 1, thus improving system efficiency.

Figure 10B:
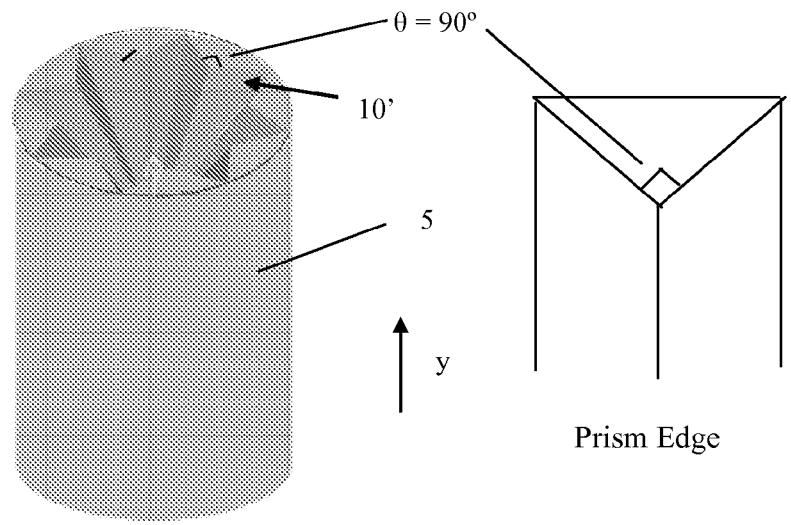
Figure 10C:
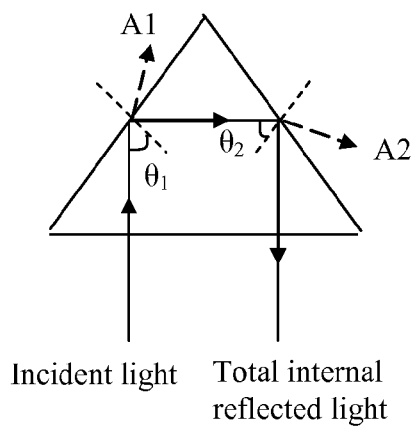
Figure 10D:
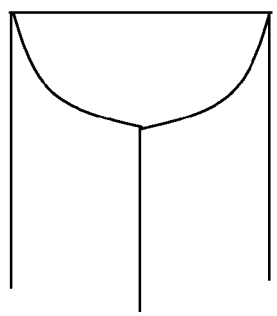

This embodiment is not limited to forming holes 10 on top of the waveguide 5 for light redistribution. The light redistribution region may instead be made of prism-shaped features 10' at the top of the waveguide 5 as shown in FIG. 10B. The angle of each prism feature 10' that is facing the y-axis is preferably 90 degrees, but it can be greater or less. The light coming from within the waveguide 5 from the LEDs 1 will have more chance to be totally internally reflected without loss and then passes through the outer surface of the waveguide 5 with the desired output angular distribution. The angle of the prism is determined by the refractive index n of the waveguide material. As an example, in the case of a glass prism with a refractive index of 1.5, the critical angle for total internal reflection to occur is 41.3°. In FIG. 10C, incident light at an angle $\theta_1$ of ~41.3°-48° to the prism will be totally internal reflected (TIR), and this will increase the amount of light distributed downwards and increase beam angle. Incident light at an angle of <41.3° will be refracted outwards from the prism and is shown by arrow A1. Incident light at an angle >48° will be TIR at angle $\theta_1$ but will not be totally internal reflected at angle $\theta_2$ (since $\theta_2$=90−$\theta_1$ and $\theta_2$ values smaller than 41.3° will not be TIR), resulting in light refracted outwards from the prism, thus increasing light being emitted sideways (shown by Arrow A2). The edge of prism is also not necessarily a straight line, it can be curved in order to achieve different intensity distribution pattern (FIG. 10D). The light distribution isotropy of an LED device will be increased as a result of using this configuration.

Embodiment 3

According to Embodiment 3 of the invention, the structure in FIG. 8 can be modified as shown in FIG. 11. For this structure, the acrylic waveguide 5 is similarly used to elevate the point of light source to the light redistribution region. In this case, the light distribution region is made of a partially transmitting mirror 11. The partially transmitting mirror 11 is formed at the top of the waveguide 5 such that it will transmit a certain percentage of the light and reflect/refract a certain percentage that is directed to it. In this case, the partially transmitting mirror 11 will reflect and refract some light downwards and sideways, but also allow some light to be distributed upwards.

The partially transmitting mirror 11 can be made of a thin metal layer, or more preferably be made of materials with different refractive indices to reduce loss/absorption, deposited on the top surface of the waveguide 5. As shown in FIG. 11, the partially transmitting mirror 11 may include a curvature or other non-planer surface tailored to provide a desired angular distribution.

Embodiment 4

According to Embodiment 4, the structure in FIG. 8 is modified to the structure shown in FIG. 12. For this structure, the waveguide 5 used to elevate the point of light source is split into two sections, the lower section 12 and upper section 13. The upper section 13 is again made of any known light guide material with minimal optical absorption such as clear polished acrylic. The lower section 12 is made of optically transparent material with high thermal conductivity, such as aluminium nitride. The thermal conductivity of the lower section 12 is high in the sense that it is substantially higher than the thermal conductivity of the upper section 13 (e.g., the thermal conductivity of aluminium nitride compared to the thermal conductivity of acrylic). The lower section 12 can be made to be a few hundreds nanometres to a few hundreds of microns thick. LEDs 1 can be mounted p-side up or p-side down in a module (represented by one or more LED chips). P-side up mounted LEDs 1 are easier to manufacture but have poorer heat dissipation properties, since most of the heat is generated in the resistive p-region, and heat will need to be dissipated through the thick chip substrate. In the case of Gallium Nitride LEDs 1, the substrate material is typically sapphire and has poor thermal properties. P-side down LEDs 1 will have lower junction temperature since the resistive p-layers are in direct contact with the metal heat-sink chassis 2 but are more difficult to manufacture. LED performance is strongly related to its operation temperature. In general, the total lumen output for an LED degrades by about 20% between 25° C. and 100° C. and LEDs are typically operated at junction temperatures between 80° C.-110° C.

In the case of a p-side up mounted LED 1, the lower section 12 is then made to contact the p-type region of the LED 1, since most of the heat is generated in the resistive p-type GaN layers for blue LEDs 1. Therefore, heat-sinking is achieved by simultaneously extracting heat from the top part of the LED 1 via the lower section 12, and heat from the bottom part of the LED 1 via the metal heat-sink chassis 2. The heat extracted via the lower section 12 is then dissipated to a thermally conductive collar 14 connected to the perimeter of the lower section 12. The collar 14 in turn dissipates the heat to the metal heat-sink chassis 2. The collar 14 can be made of high thermal conductivity material such as copper or ceramic. With additional heat-sinking area from the lower section 12 and collar 14 in this structure, the metal heat-sink chassis 2 can be made smaller for the LED bulb device. This is preferable since the large metal chassis 2 on LED bulb device makes the product design less desirable. The dashed line 15 and dotted line 16 in FIG. 12 exemplify respectively how the metal chassis 2 and glass casing 8 may be reduced in size as a result. Embodiment 4 is particularly useful for achieving a small product size, improving product design while maintaining good heat dissipation properties.

In another aspect of this embodiment, the lower section 12 contains an optically transparent liquid. Heat generated by the LED device is then dissipated by convection through the liquid.

The light extraction and redistribution region 7 in this embodiment may be any of those described herein.

According to any of the embodiments described herein, the structure of the waveguide 5 atop the LED(s) 1 can also act as a natural protective layer for the LED module. In an LED module (which is composed of one or more LED chips forming the LEDs 1), an epoxy resin is conventionally used to encapsulate the LED chips for protection from the environment, such as moisture. However, the epoxy can degrade due to prolonged exposure to UV light, such as UV emission from sun-light. This results in colouration or 'yellowing' of the epoxy, degrading the LED efficacy. By sealing the LED module using the waveguide 5 as described herein, the LEDs 1 are encapsulated by the waveguide 5, thus mitigating the issue of epoxy degradation. An exemplary material for use as the waveguide 5 in such embodiment is Poly(methyl methacrylate) (PMMA) which blocks/reduces ultra violet (UV) light exposure to the LED 1.

Embodiment 5

According to Embodiment 5, if multiple module LEDs 1 are used in the LED device, the structure in FIG. 8 can be modified to that shown in FIG. 14A. The description in the embodiments so far has been focused on a single module LED 18 referred to as "LED", the plan view of the LED configuration is shown in FIG. 13A. The single module LED 18 is placed on the metal heat-sink chassis 2. A single module LED 18 can include a plurality of LED chips 19. However it can be desirable to use an alternative configuration, for example to reduce heating effects introduced by thermal proximity of LED chips in a single module LED 18. FIG. 13B shows an alternative method to configure multiple LEDs in a bulb, whereby LEDs are oriented in a circular manner. Thermal proximity effect is reduced in this manner. FIG. 14A illustrates the side view how the invention can be modified to accommodate for multiple LEDs or LED modules configuration. In FIG. 14A, one waveguide is mounted on top of each LED or LED module 18, and each waveguide 5 has its own light extraction and redistribution region at the top 22 The light extraction and redistribution region at the top 22 can be made, for example, in accordance with any of the above embodiments. For example, the light extraction and redistribution regions at the top 22 of each waveguide 5 may include a pocket 6 filled with fine glass beads, holes 10, a partially transmitting mirror 11, etc.

In FIG. 14B, a single or common light extraction and redistribution region 23 is used on top of the multiple waveguides 5. This method allows light mixing to occur. For example, a warm white colour temperature LED module 24 and a cold white colour temperature LED module 25 are used in the LED device. The light from these LEDs is guided using their own waveguides 5 and mixed at the light extraction and redistribution region 23. This allows a variable colour temperature LED device to be configured. This concept can similarly be used for RGB LEDs. Each LED would have a different emission wavelength and would be coupled to a waveguide as described in FIG. 14B. Colour mixing is achieved in region 23. The light extraction and redistribution region 23 can be made, for example, using any of the techniques described above in relation to the other embodiments.

Accordingly, this embodiment can be used to create an LED device with colour mixing properties and wide beam angle, low loss and good heat dissipation.

Embodiment 7

According Embodiment 7, a remote phosphor LED device can also be configured from the structure of FIG. 9, for example. In some instances, LEDs 1 are coated with phosphors to convert the light emission spectrum from the LED 1 into a different light spectrum. This is a source of light scattering from the LED 1 by the phosphor which will increase light absorption and consequently reduced the LED efficiency. By placing the phosphor remotely on top of the waveguide 5, scattering within the LED is reduced, and this will improve efficiency. In FIG. 15, the phosphor is incorporated in the light extraction and redistribution region 7, for example. The phosphor material can be made of any phosphor material or nanoparticles, and may be utilized in any of the embodiments described herein.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

Industrial Applicability

The invention thereby provides an LED device with wide beam angle, good heat dissipation properties, and with minimal light loss when creating wide beam angle. The invention further provides a method for low cost volume manufacturing allowing an LED device to be competitive against conventional incandescent and CFL lamps.

The invention claimed is:

1. A light emitting diode device, comprising:
at least one light emitting diode;
a heat-sink chassis having a surface upon which the at least one light emitting diode is mounted; and
a waveguide having one end coupled to the at least one light emitting diode for receiving light therefrom, and another end which includes a light extraction and redistribution region,
wherein the waveguide is configured to guide light received from the at least one light emitting diode away from the heat-sink chassis and towards the light extraction and redistribution region, and the light extraction and redistribution region is configured to extract and redistribute the light from the waveguide, and the light extraction and redistribution region comprises a top section of the waveguide hollow to form a pocket region, with glass beads located within the pocket region.

2. The light emitting diode device according to claim 1, wherein the light extraction and redistribution region is configured to redistribute at least some of the light back towards the heat-sink chassis without the light being shielded by the heat-sink chassis.

3. The light emitting diode device according to claim 1, wherein the glass beads are embedded in resin within the pocket region.

4. A light emitting diode device, comprising:
at least one light emitting diode;
a heat-sink chassis having a surface upon which the at least one light emitting diode is mounted; and
a waveguide having one end coupled to the at least one light emitting diode for receiving light therefrom, and another end which includes a light extraction and redistribution region,
wherein the waveguide is configured to guide light received from the at least one light emitting diode away from the heat-sink chassis and towards the light extraction and redistribution region, and the light extraction and redistribution region is configured to extract and redistribute the light from the waveguide,
the waveguide elevates the light from the light emitting diode towards the light extraction and distribution region along an axis, the light extraction and redistribution region comprises prism-shaped features formed at the another end of the waveguide on a top surface perpendicular to the axis, and the prism-shaped features being configured to induce total internal reflection of the light whereby the reflected light passes through an outer side surface of the waveguide at a desired angular distribution.

5. A light emitting diode device, comprising:
at least one light emitting diode;
a heat-sink chassis having a surface upon which the at least one light emitting diode is mounted; and
a waveguide having one end coupled to the at least one light emitting diode for receiving light therefrom, and another end which includes a light extraction and redistribution region,
wherein the waveguide is configured to guide light received from the at least one light emitting diode away from the heat-sink chassis and towards the light extraction and redistribution region, and the light extraction and redistribution region is configured to extract and redistribute the light from the waveguide,
the waveguide elevates the light from the light emitting diode towards the light extraction and distribution region along an axis, the light extraction and redistribution region comprises a partially transmitting mirror at the another end of the waveguide on a top surface perpendicular to the axis, and the partially transmitting mirror being configured to reflect a portion of the light whereby the reflected portion passes through an outer side surface of the waveguide at a desired angular distribution, and to transmit a different portion of the light through the top surface.

6. The light emitting diode device according to claim 1, wherein the waveguide comprises a lower section adjacent the at least one light emitting diode and an upper section adjacent the light extraction and redistribution region, the lower section having a thermal conductivity which is higher than the thermal conductivity of the upper section, and the light emitting diode device further includes a thermally conductive collar configured to dissipate heat, extracted by the lower section from the at least one light emitting diode, to the heat sink chassis.

7. The light emitting diode device according to claim 6, wherein the lower section comprises aluminum nitride.

8. The light emitting diode device according to claim 6, wherein the lower section comprises optically transparent liquid through which the heat from the at least one light emitting diode is extracted by convection.

9. The light emitting diode device according to claim 1, wherein the waveguide comprises a material which blocks or reduces ultra violet (UV) light exposure to the at least one light emitting diode.

10. The light emitting diode device according to claim 9, wherein the material comprises Poly(methyl methacrylate) (PMMA).

11. The light emitting diode device according to claim 1, comprising a plurality of light emitting diodes mounted to the surface of the heat-sink chassis, and a plurality of waveguides each having one end coupled to a respective at least one of the plurality of light emitting diodes for receiving light therefrom, and another end which includes a light extraction and redistribution region, wherein each of the plurality of waveguides is configured to guide light received from the respective at least one light emitting diode away from the heat-sink chassis and towards the light extraction and redistribution region, and the light extraction and redistribution region is configured to extract and redistribute the light from the waveguide.

12. The light emitting diode device according to claim 11, wherein the light extraction and redistribution region of each of the plurality of waveguides combine to form a common light extraction and redistribution region.

13. The light emitting device according to claim 11, wherein the plurality of light emitting diodes have different temperature or color characteristics.

14. The light emitting device according to claim 1, wherein the light extraction and redistribution region(s) comprise phosphors or nanophosphors.

15. The light emitting diode device according to claim 5, wherein the partially transmitting mirror is made of a thin metal layer.

* * * * *